2,977,192
PROCESS FOR THE PRODUCTION OF PHOSPHINE AND SODIUM HYPOPHOSPHITE

Richard W. Cummins, Rahway, N.J., assignor to Food Machinery and Chemical Corporation, New York, N.Y., a corporation of Delaware No Drawing. Filed Aug. 26, 1958, Ser. No. 757,186

6 Claims. (Cl. 23—107)

This invention relates to an improved process for the production of phosphine and sodium hypophosphite.

Phosphine and sodium hypophosphite are produced commercially by the reaction of sodium hydroxide and water on white phosphorus to yield phosphine and sodium hypophosphite. This reaction may be illustrated by the following equation:

$$4P + 3H_2O + 3NaOH \rightarrow PH_3 + 3NaH_2PO_2$$

The reaction is usually carried out in an aqueous medium in which there is a considerable amount of water present over and above that necessary to enter into the reaction to form phosphine and sodium hypophosphite.

This prior art process exemplified above has numerous disadvantages, foremost among which are the relatively high reaction temperature and long reaction time required, the relatively small yields of phosphine and sodium hypophosphite, and the contamination of the final products with a significant amount of diphosphine and sodium orthophosphite.

According to this invention there is provided a process for the production of phosphine and sodium hypophosphite by the action of water and sodium hydroxide on white phosphorus in a reaction medium comprising at least about 70% alcohol by volume. In this process at least about 70% of the water above that necessary to enter into the reaction is replaced by an equivalent volume of a lower aliphatic alcohol, preferably methyl or ethyl alcohols.

The reaction mechanism is believed to be substantially the same as that of the prior art, but when the reaction is carried out according to the teachings of this invention, the reaction temperature may be as low as 50° C. and yields of at least 95% phosphine and at least about 60% sodium hypophosphite are obtained based on the above equation. The reaction proceeds smoothly and rapidly, and the reaction products are substantially free of diphosphine. The effect on the phosphine yield of replacing an entirely aqueous medium with varying concentrations of an alcohol may be seen from Table I below:

TABLE I

| Methyl Alcohol (Percent v./v.) | Reaction Temp. (° C.) | Phosphine Yield (Percent) |
| --- | --- | --- |
| 0 | 60–95 | 27 |
| 49 | 50–80 | 63 |
| 73 | 50 | 97 |
| 98 | 50 | 101 |

All alcohol concentrations are volume to volume, eliminating the water theoretically required in the reaction.

From this table it will be seen that when the prior art aqueous medium is employed, the yield of phosphine is only 27%, whereas, when the aqueous medium is replaced by at least about 70% methyl alcohol solution, the yield of phosphine obtained is practically theoretical.

According to the above equation, the ratio of sodium hydroxide to phosphorus required is 0.75 mol per gram atom. It has been found, however, that lower ratios may be used but that in case the ratio of sodium hydroxide to phosphorus drops below about 0.60 mol per gram atom, the yield of phosphine decreases significantly. The effect of varying the ratio of sodium hydroxide to phosphorus on the production of phosphine in a 98% methanol solution may be seen from Table II below:

TABLE II

| Mols of NaOH per g. Atom of Phosphorus | Phosphine Yield (Percent) |
| --- | --- |
| 0.00 | 0 |
| 0.25 | 37 |
| 0.50 | 78 |
| 0.60 | 94 |
| 0.70 | 101 |

In the commercial process illustrated above, part of the sodium hypophosphite resulting from the reaction is converted to sodium orthophosphite in a side reaction which may be illustrated as follows:

$$NaH_2PO_2 + NaOH \rightarrow Na_2HPO_3 + H_2$$

This side reaction is difficult to control and results in considerable contamination of the sodium hypophosphite. This side reaction is particularly undesirable when it is desired to produce a high purity phosphine uncontaminated with hydrogen gas.

It has surprisingly now been found that sodium hypophosphite having a high mol ratio of sodium hypophosphite to sodium orthophosphite may be produced if the reaction is carried out in a medium comprising substantially 100% alcohol, using only approximately the theoretical quantity of water necessary for the reaction. If a small amount of orthophosphite is not objectionable the reaction medium need not be substantially 100% alcohol but may be as low as about 70% alcohol. The data in Table III below illustrate the effect obtained when the alcoholic medium is varied and show that a high mol ratio of hypophosphite to orthophosphite is obtained when substantially 100% alcohol is used as the reaction medium.

TABLE III

| Alcohol Concentration (Percent v./v.) | Phosphorus Conversion (Percent) to— | | Mol Ratio of Hypo- to Ortho- phosphite |
| --- | --- | --- | --- |
| | Hypophosphite | Orthophosphite | |
| None | 44 | 12 | 3.7 |
| Methyl 49 | 59 | 19.5 | 3.0 |
| Methyl 74 | 46 | 6.3 | 7.3 |
| Methyl 98 | 48 | 1.2 | 40 |
| Methyl 100 | 45 | 1.0 | 45 |
| Ethyl 100 | 63 | 4.5 | 14 |
| Ethyl 100 | 60 | 2.8 | 21 |

In carrying out the process of this invention the phosphorus is usually added to about half of the total alcohol to be used in the reaction, the temperature raised and the reaction mixture thoroughly agitated so that the phosphorus is generally present in the alcoholic medium as a molten suspension. The remaining portion of the alcohol is then mixed with sodium hydroxide to which is added the water necessary for the reaction. This latter mixture is slowly added to the phosphorus-alcohol suspension to prevent too vigorous evolution of phosphine. The reaction is generally complete in an hour or so, and the temperature range may vary from about 44° to about 90° C., preferably from about 50°–55° C.

The phosphine is evolved as a gas and may be recovered and stored by conventional means or may be used directly as an intermediate in further synthetic reactions. When methanol is used as the reaction medium, the sodium hypophosphite may be recovered by evaporation of the solvent or by other conventional means. When ethanol is used as the reaction medium, most of the sodium hypophosphite precipitates and may be recovered by filtration.

The reaction may be run continuously by adding water and alcoholic alkali from one point and continuously introducing a suspension of phosphorus in alcohol from another point into a reaction chamber, and continuously removing phosphine and sodium hypophosphite from the chamber.

The following examples are illustrative of the invention and obvious modifications may be made without departing from the spirit and scope of the invention, which is defined in the claims.

*Example No. 1*

White phosphorus (1.00 ml., 0.0563 g. atom) was placed under 25 ml. of water in a 250-ml., three-necked, round-bottomed flask fitted with a magnetic stirrer, dropping funnel with pressure equalizer tube, nitrogen inlet tube, reflux condenser and a gas exit tube. A solution of 2.07 ml. of 50% sodium hydroxide in 16.6 ml. of water (0.0394 mol of sodium hydroxide; 0.70 mol of sodium hydroxide per g. atom of phosphorus) was placed in the dropping funnel and the system purged with nitrogen. The water-phosphorus mixture was maintained at 60° C. by means of a water bath, and, while stirring vigorously, the aqueous sodium hydroxide solution was added dropwise over a 30-minute period. Little or no phosphine was evolved during this time. The temperature was then raised to 95° C. and maintained at this level for two hours when the run was terminated. A yield of 0.128 g. of phosphine was obtained which corresponds to a 6.7% conversion of phosphorus to phosphine which is only 26.6% of theory.

*Example No. 2*

White phosphorus (1.00 ml., 0.0563 g. atom) was placed under 25 ml. of methyl alcohol in the equipment described in Example No. 1 and 2.07 ml. of 50% sodium hydroxide (0.0394 mol of sodium hydroxide) in 16.6 ml. of methyl alcohol was added to the phosphorus-methyl alcohol mixture at 50° C. over a 30-minute period and the mixture maintained at 50° C. The reaction was substantially complete after an hour. Phosphine corresponding to a 25.2% conversion of phosphorus was obtained which is 100.7% of theory.

*Example No. 3*

White phosphorus (8.5 ml., 0.48 g. atom) was introduced under 200 ml. of methyl alcohol in a 500-ml. 3-necked, Morton flask fitted with a glass mechanical stirrer, a dropping funnel, a nitrogen inlet tube and a gas outlet tube leading to a water trap and thence to a tube extending into a Bunsen flame. After sweeping with nitrogen was warming to 50–55° C., a solution, prepared by dissolving 15.0 g. (0.38 mol) of sodium hydroxide in 194 ml. of methyl alcohol and 6.8 ml. of water, was added at a uniform rate over an 0.8-hour period. Evolution of phosphine was substantially complete at this time. After 3.0 hours the reaction mixture was filtered. The filtrate was found to contain 0.6 g. of sodium orthophosphite and 19.0 g. of sodium hypophosphite corresponding to a 45.0% conversion of the phosphorus to hypophosphite. The mol ratio of hypo- to orthophosphite was 45.

*Example No. 4*

White phosphorus (8.5 ml., 0.48 g. atom) was placed under 200 ml. of methyl alcohol in the equipment described in Example No. 1 and a solution of 19.6 ml. of 50% by weight sodium hydroxide (0.38 mol) in 180 ml. of methyl alcohol was added over a 0.5 hour period while maintaining the temperature at 50–55° C. After a period of 3.0 hours from the first addition of alkali the mixture was filtered. It contained 0.7 g. of sodium orthophosphite and 20.2 g. of sodium hypophosphite corresponding to a 47.7% conversion of the phosphorus to hypophosphite. The mol ratio of hypo- to orthophosphite was 41.

*Example No. 5*

White phosphorus (8.5 ml., 0.48 g. atom) was introduced below the surface of 200 ml. of 100% ethyl alcohol in the equipment described in Example No. 1 and an ethyl alcohol solution of sodium hydroxide, prepared by dissolving 15.0 g. (0.38 mol) of sodium hydroxide in 194 ml. of ethyl alcohol and 6.8 ml. of water was added to the reaction mixture over a 1-hour period at 50–55° C. After a total of 3.0 hours the mixture was filtered. The dried filter cake contained 1.6 g. of sodium orthophosphite and 22.1 g. of sodium hypophosphite. The filtrate contained 1.1 g. of sodium orthophosphite and 4.7 g. of sodium hypophosphite. The total yield of sodium hypophosphite was thus 26.8 g. corresponding to 84.5% of theoretical. The mol ratio of hypo- to orthophosphite was 14.

*Example No. 6*

White phosphorus (19.9 g., 0.642 g. atom) and 300-ml. of 100% ethyl alcohol were placed in a 1000-ml. reactor similar to that described in Example No. 1. A solution of 19.3 g. (0.483 mol) of sodium hydroxide in 300 ml. of 100% ethyl alcohol and 8.7 ml. of water was added over a 45-minute period while maintaining the temperature at 50° C. After a total of 3.5 hours of reaction the mixture contained 33.8 g. of sodium hypophosphite and 2.3 g. of sodium orthophosphite corresponding to a 59.8% conversion of the phosphorus to hypophosphite corresponding to 79.8% of theoretical. The mol ratio of hypo- to orthophosphite was 21. The yield of phosphine was 24% based on phosphorus, 96% of theoretical.

I claim:

1. A process for the simultaneous production of phosphine and sodium hypophosphite which comprises reacting phosphorus, sodium hydroxide, and a stoichiometric amount of water in a water-alcohol medium comprising at least about 70% by volume of an alcohol selected from the group consisting of methyl and ethyl alcohols, said sodium hydroxide bting present in the amount of at leasta bout 0.60 mole per mole of phosphorus, whereby said phosphine and said sodium hypophosphite are produced in yields of at least about 95% of phosphine and at least about 60% of sodium hypophosphite, said sodium hypophosphite being present in the amount of at least 7 moles per mole of sodium orthophosphite produced, and recovering said phosphine and sodium hypophosphite.

2. A process for the production of a product mixture containing phosphine and sodium hypophosphite which comprises, reacting 4 moles of phosphorus with 3 moles of water and at least 0.60 mole of sodium hydroxide per mole of phosphorus, said reaction being carried out in a water-alcohol medium comprising at least about 70% by volume of an alcohol selected from the group consisting of methyl and ethyl alcohols, whereby said phosphine is produced in yields of at least about 95%, and recovering said phosphine.

3. The process of claim 2 in which the mol ratio of sodium hydroxide to phosphorus is at least 0.70.

4. The process of claim 2 in which the reaction medium is about 100% of an alcohol selected from the group consisting of ethyl and methyl alcohols.

5. A process for the production of a product mixture containing sodium hypophosphite and phosphine in which the mole ratio of hypophosphite to orthophosphite is at least 14 to 1 which comprises reacting phosphorus, sodium hydroxide, and a stoichiometric amount of water in a water-alcohol medium comprising substantially 100% of an alcohol selected from the group consisting of methyl and ethyl alcohols, said sodium hydroxide being present in the amount of at least about 0.60 mole per mole of phosphorus, whereby said sodium hypophosphite is produced in yields of at least about 60%, and recovering said sodium hypophosphite.

6. A process for the production of a product mixture containing sodium hypophosphite and phosphine which comprises reacting 4 moles of phosphorus with from 3 to 6 moles of water and at least 0.60 mole of sodium hydroxide per mole of phosphorus, said reaction being carried out in a water-alcohol medium comprising at least about 70% by volume of an alcohol selected from the group consisting of methyl and ethyl alcohols, whereby said sodium hypophosphite is produced in yields of at least about 60%, said sodium hypophosphite being present in the amount of at least 7 moles per mole of sodium orthophosphite produced, and recovering said sodium hypophosphite.

References Cited in the file of this patent

Mellor: Comprehensive Treatise on Inorganic and Theoretical Chemistry, vol. 8, 1928, pages 802–808.